(12) United States Patent
Kamiya

(10) Patent No.: US 11,549,643 B2
(45) Date of Patent: Jan. 10, 2023

(54) PRESSURE VESSEL AND PRESSURE-VESSEL MANUFACTURING METHOD

(71) Applicant: KABUSHIKI KAISHA TOYOTA JIDOSHOKKI, Kariya (JP)

(72) Inventor: Ryuta Kamiya, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 18 days.

(21) Appl. No.: 17/262,815

(22) PCT Filed: Jul. 17, 2019

(86) PCT No.: PCT/JP2019/028071
§ 371 (c)(1),
(2) Date: Jan. 25, 2021

(87) PCT Pub. No.: WO2020/026811
PCT Pub. Date: Feb. 6, 2020

(65) Prior Publication Data
US 2021/0310614 A1     Oct. 7, 2021

(30) Foreign Application Priority Data
Jul. 31, 2018  (JP) .............................. JP2018-143920
Jul. 31, 2018  (JP) .............................. JP2018-143921

(51) Int. Cl.
*F17C 1/06*     (2006.01)

(52) U.S. Cl.
CPC ........ *F17C 1/06* (2013.01); *F17C 2201/0109* (2013.01); *F17C 2203/0604* (2013.01);
(Continued)

(58) Field of Classification Search
CPC ....... B29C 63/02; B29C 63/04; B29C 63/044; B29C 70/08; B29C 70/22; F17C 1/06;
(Continued)

(56) References Cited

U.S. PATENT DOCUMENTS 11,092,287  B2 *  8/2021  Kamiya ................... F16J 12/00
2017/0291352 A1 * 10/2017  Ueda ...................... B29C 53/665
2019/0277447 A1 *  9/2019  Rocher .................... F17C 1/00

FOREIGN PATENT DOCUMENTS

DE     102012205906 A1      10/2013
DE     102014223127 A1 *   5/2016   ............... D04C 1/06
(Continued)

OTHER PUBLICATIONS

International Search Report for PCT/JP2019/028071 dated Oct. 8, 2019 (PCT/ISA/210).

*Primary Examiner* — John K Fristoe, Jr.
*Assistant Examiner* — Laura E. Parker
(74) *Attorney, Agent, or Firm* — Sughrue Mion, PLLC

(57) ABSTRACT

A pressure vessel includes a liner including a cylindrical body and a dorm portion continuous with at least one end of the body in an axial direction and includes a reinforced fiber sheet covering an outer side of the liner and made of fabric. The reinforced fiber sheet includes first yarns arranged on the body and the dorm portion such that yarn main axes of the first yarns extend in the circumferential direction of the liner and second yarns arranged on the body and the dorm portion such that yarn main axes of the second yarns extend in the axial direction of the liner. A total number of the first yarns or the second yarns that exist per unit length in the axial direction of the liner is smaller in the dorm portion than in the body.

10 Claims, 9 Drawing Sheets

(52) U.S. Cl.
CPC ............... *F17C 2203/0619* (2013.01); *F17C 2203/0668* (2013.01); *F17C 2209/2154* (2013.01); *F17C 2223/0123* (2013.01)

(58) Field of Classification Search
CPC ...... F17C 2203/0604; F17C 2203/0619; F17C 2203/0668; F17C 2209/2154; F17C 2203/0602; F17C 2203/0609; F17C 2203/0612; F17C 2203/0658; F17C 2203/0663; F17C 2203/0665; F17C 2203/067; F17C 2203/0673; F17C 2203/0675; F17C 2209/2163; F17C 70/80; F17C 70/22
USPC .................................................. 220/581, 589
See application file for complete search history.

(56) References Cited

FOREIGN PATENT DOCUMENTS

| | | | | |
|---|---|---|---|---|
| DE | 102016206845 A1 | * | 10/2017 | ............... D04C 1/06 |
| EP | 1818596 A1 | * | 8/2007 | ............... F17C 1/16 |
| JP | 2017-140809 A | | 8/2017 | |
| JP | 2017-187153 A | | 10/2017 | |

* cited by examiner

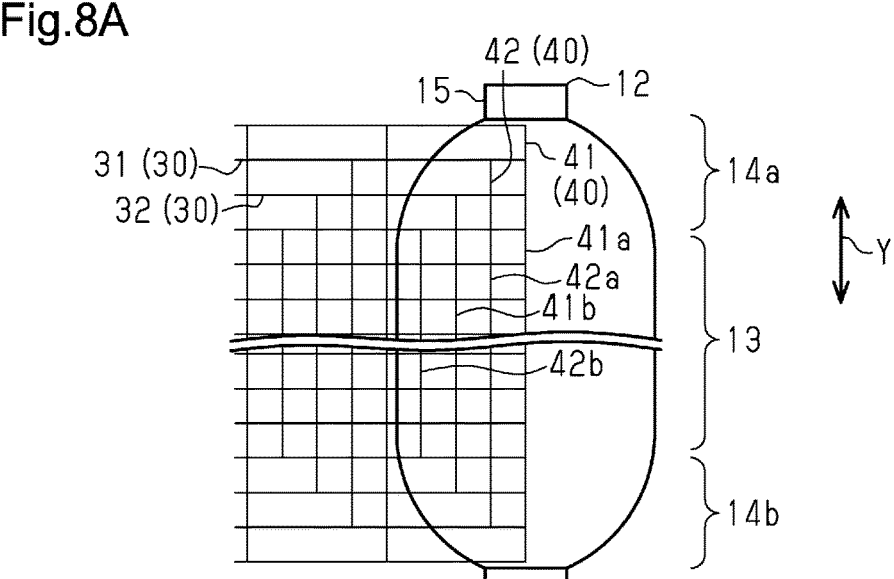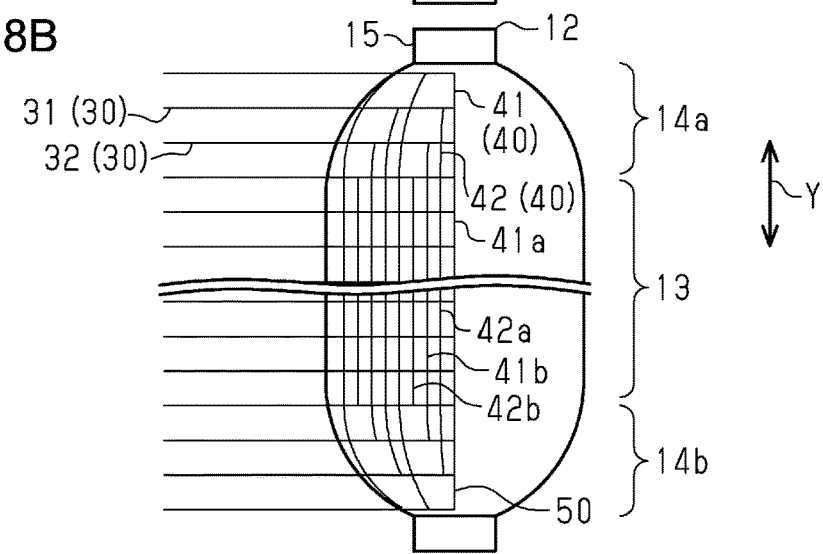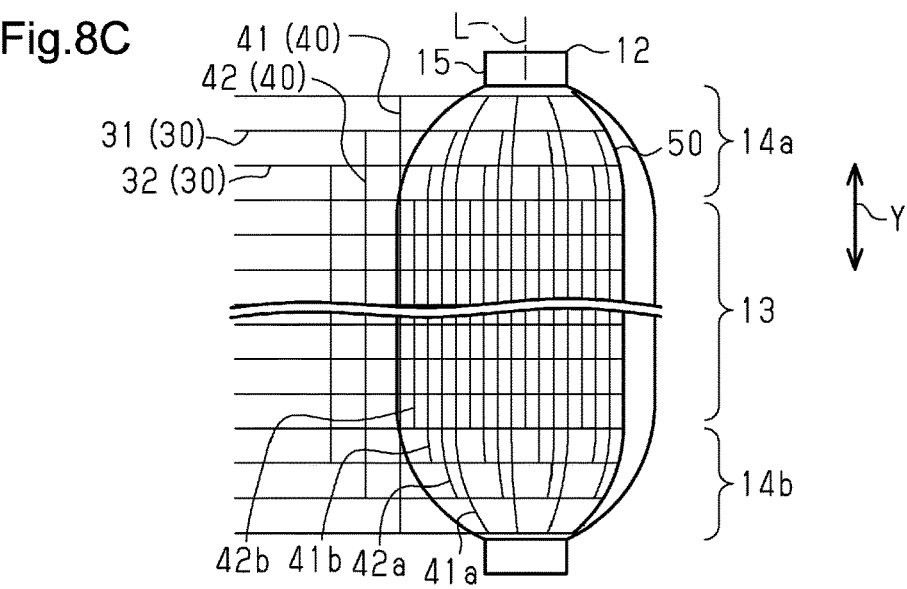

PRESSURE VESSEL AND PRESSURE-VESSEL MANUFACTURING METHOD

CROSS REFERENCE TO RELATED APPLICATIONS

This application is a National Stage of International Application No. PCT/JP2019/028071 filed Jul. 17, 2019, claiming priorities based on Japanese Patent Application No. 2018-143920 filed Jul. 31, 2018 and Japanese Patent Application No. 2018-143921 filed Jul. 31, 2018.

TECHNICAL FIELD

The present disclosure relates to a pressure vessel and a method for manufacturing a pressure vessel.

BACKGROUND ART

A pressure vessel that contains gas such as compressed natural gas (CNG) and liquefied natural gas (LNG), namely, a high-pressure tank, is generally made of metal such as stainless steel or aluminum alloy and thus has a heavy weight. Recently, automobiles using natural gas as fuel have attracted attention as environmentally-friendly vehicles. Also, automobiles using fuel cells as power source have attracted attention as more environmentally-friendly vehicles. In some automobiles, hydrogen gas is contained in a fuel tank as the fuel of fuel cells. The pressure vessel used for the fuel tank is heavy, causing such automobiles to have poor fuel economy. To solve such an inconvenience, a proposal has been made for a pressure vessel in which the outer side of a liner having gas barrier properties is covered with a fiber-reinforced composite material layer resistant to pressure. The fiber-reinforced composite material layer reinforces the liner. This allows the pressure vessel to be filled with gas having a pressure of several tens of MPa.

Generally, the liner of a pressure vessel includes a cylindrical body and a dome portion continuous with at least one end of the body in the axial direction. Patent Document 1 discloses an example of a pressure vessel in which a single reinforced fiber sheet is wound a number of times onto the outer circumferential surfaces of the body and the dome portion. Subsequently, filament winding is performed to wind continuous fibers around the body and the dome portion in a helical manner.

In the pressure vessel disclosed in Patent Document 2, the reinforced fiber sheet wound onto the pressure vessel includes first yarns arranged on the body such that their yarn main axes extend in the circumferential direction of the liner and second yarns arranged on the body and the dome portion such that their yarn main axes extend in the axial direction of the body and in the axial direction of the dome portion. The first yarns are not arranged on the dome portion, and only the second yarns are arranged on the dome portion. After the winding of the reinforced fiber sheet onto the pressure vessel, the continuous fibers impregnated with resin are wound around the dome portion through hoop winding.

PRIOR ART DOCUMENTS

Patent Documents

Patent Document 1: Japanese Laid-Open Patent Publication No. 2017-140809
Patent Document 2: Japanese Laid-Open Patent Publication No. 2017-187153

SUMMARY OF THE INVENTION

Problems that the Invention is to Solve

The pressure vessel disclosed in Patent Document 1 may be creased at the parts of the reinforced fiber sheet that are wound onto the outer circumferential surface of the dome portion.

For the pressure vessel of Patent Document 2 to be desirably resistant to pressure, it is desired that continuous fibers be wound around the dome portion so as to extend in a predetermined direction (for example, a direction orthogonal to the second yarns arranged on the dome portion). However, since the dome portion has a curved shape, it is difficult to wind continuous fibers around the dome portion while maintaining the extension direction of the continuous fibers in the entire dome portion.

It is an objective of the present disclosure to provide a pressure vessel and a method for manufacturing a pressure vessel that allow a reinforced fiber sheet to be arranged around a dome portion in a suitable manner.

Means for Solving the Problem

A pressure vessel according to an aspect of the present disclosure includes a liner including a cylindrical body and a dome portion continuous with at least one end of the body in an axial direction and includes a reinforced fiber sheet wound onto an outer circumferential surface of the liner in a circumferential direction of the liner and covering an outer side of the liner. The reinforced fiber sheet is made of fabric. The reinforced fiber sheet includes first yarns arranged on the body and the dome portion such that yarn main axes of the first yarns extend in the circumferential direction of the liner and second yarns arranged on the body and the dome portion such that yarn main axes of the second yarns extend in the axial direction of the liner. A total number of the first yarns or the second yarns that exist per unit length in the axial direction of the liner is smaller in the dome portion than in the body.

A method for manufacturing a pressure vessel according to an aspect of the present disclosure includes preparing a liner including a cylindrical body and a dome portion continuous with at least one end of the body in an axial direction and includes covering an outer side of the liner with a reinforced fiber sheet made of fabric. The covering the liner with the reinforced fiber sheet includes arranging first yarns in an axial direction of the liner over the body and the dome portion, the first yarns extending from the liner in a direction orthogonal to the axial direction of the liner, weaving the reinforced fiber sheet by repeatedly inserting second yarns extending in the axial direction of the liner into sheds created between adjacent ones of the first yarns in the axial direction of the liner and pushing the second yarns toward the liner through a beat-up motion, and winding the woven reinforced fiber sheet onto the liner by rotating the liner about a central axis of the liner concurrently with the weaving of the reinforced fiber sheet. The arrangement of the first yarns in the axial direction of the liner or the insertion of the second yarns into the sheds are performed such that a total number of the first yarns or the second yarns that exist per unit length in the axial direction of the liner becomes smaller in the dome portion than in the body.

BRIEF DESCRIPTION OF THE DRAWINGS

FIG. 8A is a diagram schematically showing a state in which the weft yarns are inserted in the second embodiment.

FIG. 8B is a diagram schematically showing a state after the beat-up motion is performed in the second embodiment.

FIG. 8C is a diagram schematically showing a state in which the reinforced fiber sheet is wound onto the liner in the second embodiment.

MODES FOR CARRYING OUT THE INVENTION

A pressure vessel and a method for manufacturing a pressure vessel according to a first embodiment will now be described with reference to FIGS. 1 to 6C.

Figure 1:
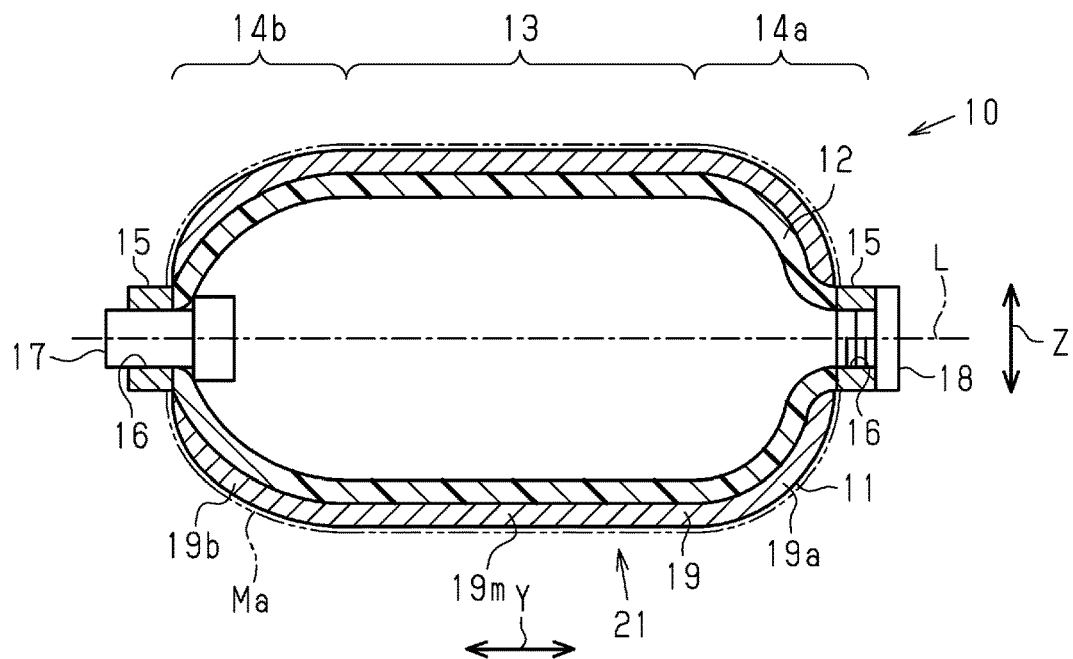
FIG. 1 is a cross-sectional view schematically showing a high-pressure tank according to a first embodiment.

As shown in FIG. 1, a high-pressure tank 10 (pressure vessel) is formed by impregnating a fiber structure 21 with matrix resin Ma. The fiber structure 21 includes an elongated hollow liner 12 and a reinforced fiber sheet 19, which covers the outer side of the liner 12. A fiber-reinforced composite material layer 11, which includes the reinforced fiber sheet 19 impregnated with the matrix resin Ma, reinforces the liner 12 to ensure the heat resistance (mechanical strength) of the high-pressure tank 10.

The liner 12 is made of plastic. The direction in which the central axis L of the liner 12 is referred to as an axial direction Y of the liner. The liner 12 includes a cylindrical body 13. The central axis of the body 13 coincides with the central axis L of the liner 12. The axial direction of the body 13 coincides with the axial direction Y of the liner 12. The liner 12 includes curved dome portions 14a, 14b at the opposite ends of the body 13 in the axial direction. The diameters of the ends of the dome portions 14a, 14b adjacent to the body 13 are the same as the diameter of the body 13, and become smaller as the distance from the body 13 becomes farther. The axial direction of the dome portions 14a, 14b coincides with the axial direction Y of the liner 12. The liner 12 includes spinnerets 15, which protrude outward from the dome portions 14a, 14b in the axial direction Y of the liner 12. Each spinneret 15 is made of metal (for example, stainless steel). Each spinneret 15 includes a hole 16, which connects to the space in the liner 12. A screw 18 is fastened to the hole 16 of the first spinneret 15, which extends from the dome portion 14a at one end of the liner 12 in the axial direction Y. A valve 17 is attached to the hole 16 of the second spinneret 15, which extends from the dome portion 14b at the other end of the liner 12 in the axial direction Y.

Figure 2:
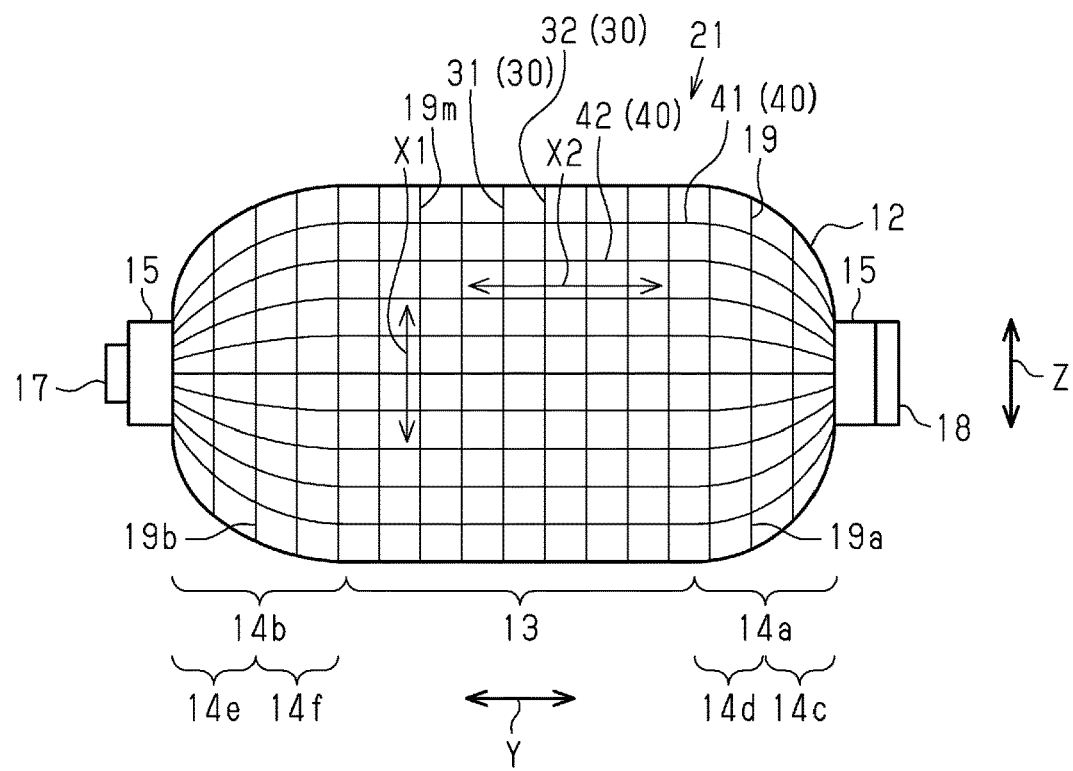
FIG. 2 is a diagram schematically showing the fiber structure of the high-pressure tank in FIG. 1.

As shown in FIG. 2, the reinforced fiber sheet 19 is an elongated fabric 50, which is woven by plainly weaving warp yarns 30 and weft yarns 40. The reinforced fiber sheet 19 is wound onto the outer circumferential surface of the liner 12 such that the longitudinal direction of the reinforced fiber sheet 19 coincides with a circumferential direction Z of the liner 12. In the reinforced fiber sheet 19, the warp yarns 30 and the weft yarns 40 are arranged to be orthogonal to each other. The warp yarns 30 are arranged in parallel to each other on the body 13 and the dome portions 14a, 14b in the axial direction Y of the liner 12. The yarn main axis of each warp yarn 30 extends in the circumferential direction Z of the liner 12. The direction in which the yarn main axis of each warp yarn 30 extends, that is, a yarn main axis direction of each warp yarn 30, is indicated by reference character "X1." Further, the radial direction of the liner 12 is orthogonal to the yarn main axis direction X1 of the warp yarn 30.

The weft yarns 40 are arranged in parallel to each other on the body 13 and the dome portions 14a, 14b in the circumferential direction Z of the liner 12. The portions of the weft yarns 40 arranged on the body 13 have yarn main axes extending in the axial direction of the body 13. The portions of the weft yarns 40 arranged on the dome portions 14a, 14b have yarn main axes extending in the axial direction Y of the liner 12 and curved along the curved surfaces of the dome portions 14a, 14b. The direction in which the yarn main axes of the weft yarns 40 extend, that is, a yarn main axis direction of the weft yarns 40, is indicated by reference character "X2."

The warp yarns 30 and the weft yarns 40 are arranged to be orthogonal to each other and the yarn main axis direction X1 of the warp yarns 30 is coincided with the circumferential direction Z of the liner 12 to reinforce the liner 12 in the radial direction of the liner 12. Further, the yarn main axis direction X2 of the weft yarns 40 is coincided with the axial direction Y of the liner 12 to reinforce the liner 12 in the axial direction Y of the liner 12.

The warp yarns 30 include first reinforced fibers 31 and first auxiliary yarns 32. The first reinforced fibers 31 and the first auxiliary yarns 32 are alternately arranged so as to be adjacent to each other in the axial direction Y of the liner 12. The first reinforced fibers 31 are arranged in parallel to each other. The first auxiliary yarns 32 are arranged in parallel to each other. The first reinforced fibers 31 and the first auxiliary yarns 32 are arranged in parallel to each other.

The weft yarns 40 include second reinforced fibers 41 and second auxiliary yarns 42. The second reinforced fibers 41 and the second auxiliary yarns 42 are alternately arranged so as to be adjacent to each other in the circumferential direction Z of the liner 12. The second reinforced fibers 41 are arranged in parallel to each other. The second auxiliary yarns 42 are arranged in parallel to each other. The second reinforced fibers 41 and the second auxiliary yarns 42 are arranged in parallel to each other. The first reinforced fiber 31 and the first auxiliary yarn 32 correspond to first yarns, and the second reinforced fiber 41 and the second auxiliary yarn 42 correspond to second yarns.

In the present embodiment, the first reinforced fibers 31, the second reinforced fibers 41, the first auxiliary yarns 32, and the second auxiliary yarns 42 are formed from carbon fibers. The first reinforced fibers 31, the second reinforced fibers 41, the first auxiliary yarns 32, and the second auxiliary yarns 42 do not have to be formed from carbon fibers and may be formed from other fibers that generally have high elasticity and high strength, such as glass fibers, silicon carbide fibers, aramid fibers, or ultra-high-molecular-weight polyethylene fibers. In the present embodiment, the first reinforced fiber 31 and the second reinforced fiber 41 are the same type of fibers. The first auxiliary yarn 32 and the second auxiliary yarn 42 include finer fiber bundles than the first reinforced fiber 31 and the second reinforced fiber 41.

Figure 3A:
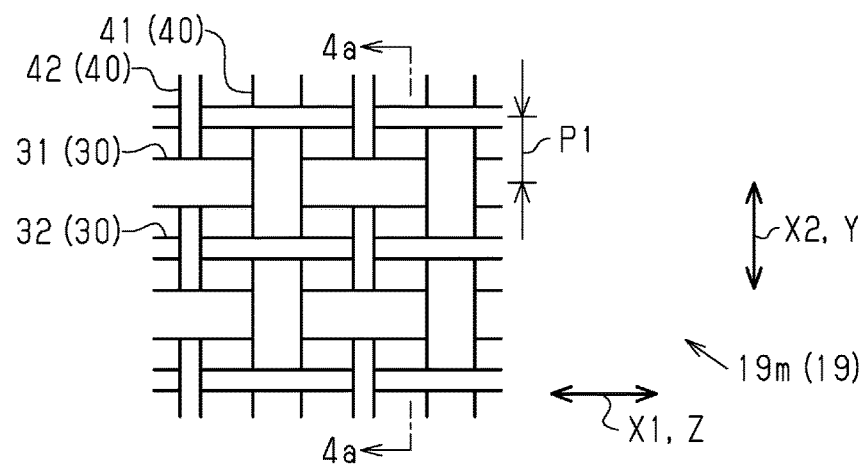
FIG. 3A is a diagram schematically showing the body sheet portion of the reinforced fiber sheet in the first embodiment.
Figure 3B:
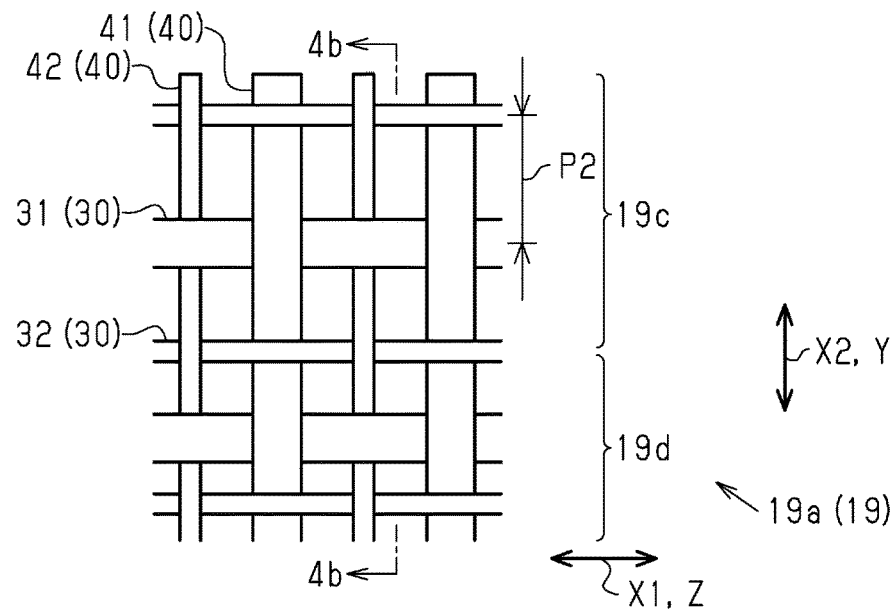
FIG. 3B is a diagram schematically showing one of the dome sheet portions of the reinforced fiber sheet.
Figure 3C:
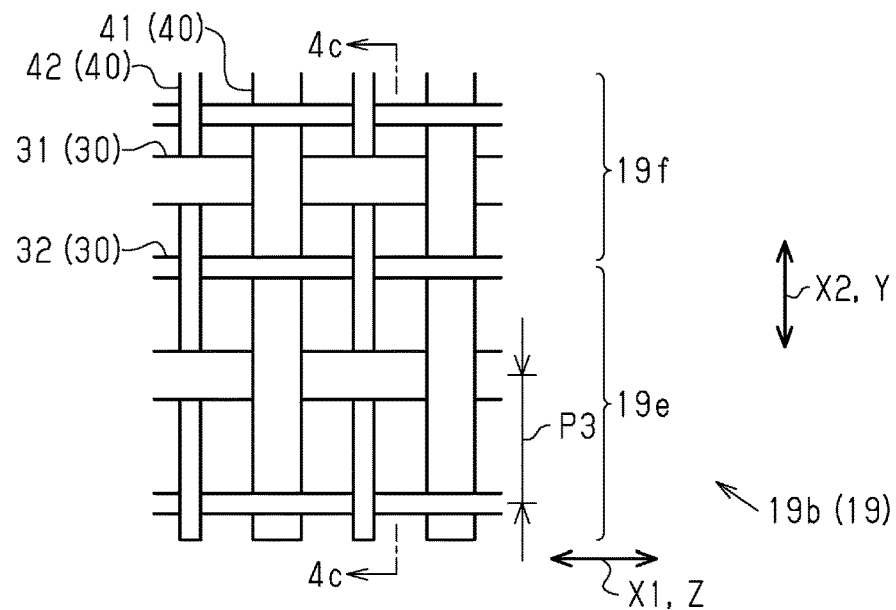
FIG. 3C is a diagram schematically showing the other dome sheet portion of the reinforced fiber sheet.

As shown in FIG. 3A, the body 13 of the liner 12 is covered by a body sheet portion 19m, which is a part of the reinforced fiber sheet 19. As shown in FIG. 3B, the dome portion 14a of the liner 12 is covered by a dome sheet portion 19a, which is a part of the reinforced fiber sheet 19. As shown in FIG. 3C, the dome portion 14b of the liner 12 is covered by a dome sheet portion 19b, which is a part of the reinforced fiber sheet 19.

As shown in FIG. 3A, in the body sheet portion 19m, the arrangement pitch of the first reinforced fiber 31 and the first auxiliary yarn 32 adjacent to each other is P1. The arrangement pitch refers to the distance between the central axes of adjacent yarns. In the axial direction Y of the liner 12, the arrangement pitch P1 is fixed. As shown in FIG. 3B, in the dome sheet portion 19a, the first reinforced fiber 31 and the first auxiliary yarn 32 adjacent to each other have an arrangement pitch P2, which is greater than the arrangement pitch P1. As shown in FIG. 3C, in the dome sheet portion 19b, the first reinforced fiber 31 and the first auxiliary yarn 32 adjacent to each other have an arrangement pitch P3, which is greater than the arrangement pitch P1. The arrangement pitches P1, P2, P3 are set in this manner. Thus, the total number N of the first reinforced fibers 31 and the first auxiliary yarns 32 that exist per unit length in the axial direction Y of the liner 12 is smaller in the dome sheet portions 19a, 19b than in the body sheet portion 19m.

In FIGS. 3A, 3B, and 3C, gaps seem to exist between the first reinforced fibers 31 and the first auxiliary yarns 32 adjacent to each other and between the second reinforced fibers 41 and the second auxiliary yarns 42 adjacent to each other, but such gaps do not actually exist. In the actual reinforced fiber sheet 19, the first reinforced fibers 31 and the first auxiliary yarns 32 adjacent to each other are arranged in contact with each other in the axial direction Y of the liner 12, and the second reinforced fibers 41 and the second auxiliary yarns 42 adjacent to each other are arranged in contact with each other in the circumferential direction Z of the liner 12.

In the dome sheet portions 19a, 19b, the arrangement pitches P2, P3 become smaller toward the body 13 in the axial direction of the dome portions 14a, 14b. In the dome portion 14a, the part located away from the body 13 in the axial direction Y of the liner 12 (the right part of the dome portion 14a in FIG. 2) is referred to as a first dome portion 14c, and the part located close to the body 13 in the axial direction Y of the liner 12 (the left part of the dome portion 14a in FIG. 2) is referred to as a second dome portion 14d. In the dome portion 14b, the part located away from the body 13 in the axial direction Y of the liner 12 (the left part of the dome portion 14b in FIG. 2) is referred to as a first dome portion 14e, and the part located close to the body 13 in the axial direction Y of the liner 12 (the right part of the dome portion 14a in FIG. 2) is referred to as a second dome portion 14f. The part of the dome sheet portion 19a covering the first dome portion 14c (upper part in FIG. 3B) is referred to as a first sheet portion 19c, and the part of the dome sheet portion 19b covering the first dome portion 14e (lower part in FIG. 3C) is referred to as a first sheet portion 19e. The part of the dome sheet portion 19a covering the second dome portion 14d (lower part in FIG. 3B) is referred to as a second sheet portion 19d, and the part of the dome sheet portion 19b covering the second dome portion 14f (upper part in FIG. 3C) is referred to as a second sheet portion 19f. In the dome sheet portion 19a, the arrangement pitch P2 of the second sheet portion 19d is smaller than the arrangement pitch P2 of the first sheet portion 19c. In the dome sheet portion 19b, the arrangement pitch P3 of the second sheet portion 19f is smaller than the arrangement pitch P3 of the first sheet portion 19e.

Figure 4A:
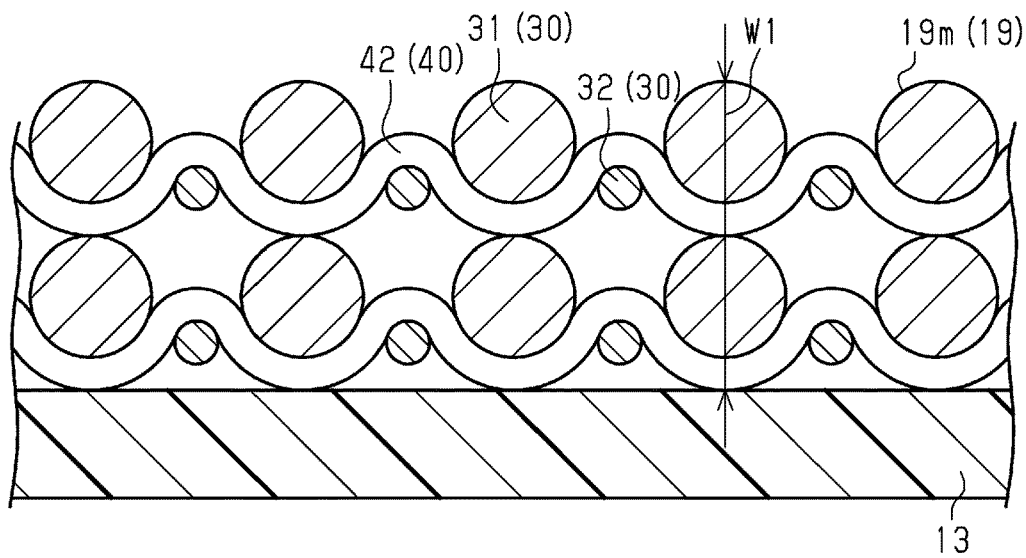
FIG. 4A is a cross-sectional view taken along line 4a-4a in FIG. 3A.
Figure 4B:
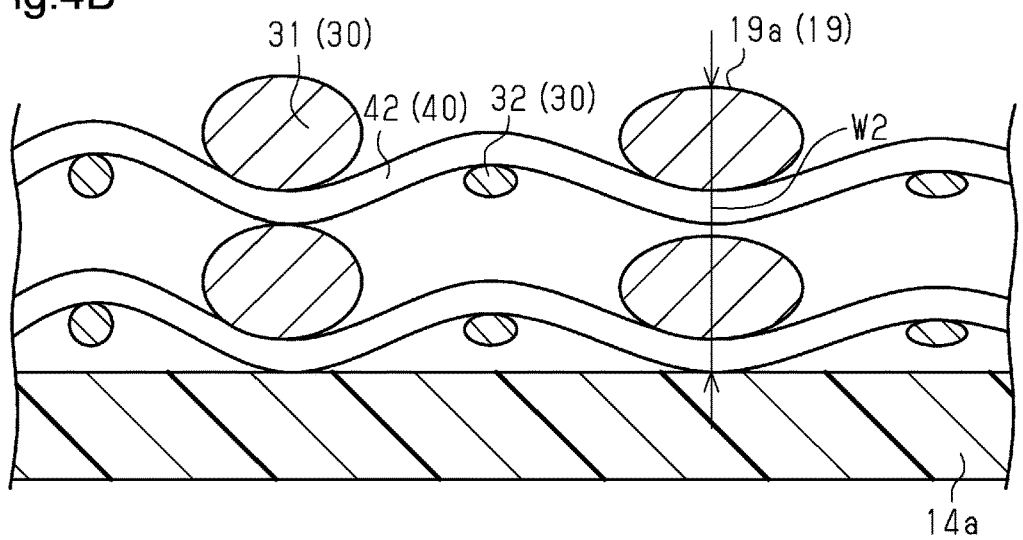
FIG. 4B is a cross-sectional view taken along line 4b-4b in FIG. 3B.
Figure 4C:
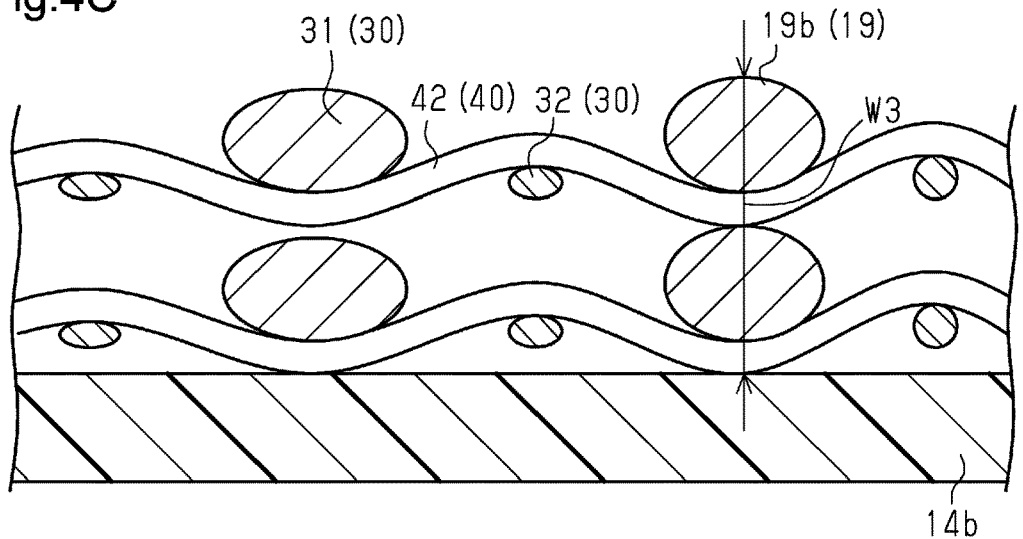
FIG. 4C is a cross-sectional view taken along line 4c-4c in FIG. 3C.

As shown in FIG. 4A, the first reinforced fibers 31 and the first auxiliary yarns 32 arranged on the body sheet portion 19m are relatively thick and narrow. As shown in FIGS. 4B and 4C, the first reinforced fibers 31 and the first auxiliary yarns 32 arranged on the dome sheet portions 19a, 19b are flat, and thinner and wider than the first reinforced fibers 31 and the first auxiliary yarns 32 arranged on the body sheet portion 19m. Thus, in the reinforced fiber sheet 19, the thickness W2 of the dome sheet portion 19a and the thickness W3 of the dome sheet portion 19b are smaller than the thickness W1 of the body sheet portion 19m.

As shown in FIGS. 4B and 4C, in the dome sheet portions 19a, 19b, the arranged first reinforced fibers 31 and first auxiliary yarns 32 become thinner and wider as the distance from the body 13 becomes farther in the axial direction of the dome portions 14a, 14b (i.e., become thinner and wider toward the right side in FIG. 4B and toward the left side in FIG. 4C). Thus, the thicknesses W2, W3 of the dome sheet portions 19a, 19b become smaller as the distance from the body 13 becomes farther in the axial direction of the dome portions 14a, 14b.

The method for manufacturing the high-pressure tank 10 will now be described.

To manufacture the high-pressure tank 10, while the warp yarns 30 and the weft yarns 40 are used to plainly weave the fabric 50, the fabric 50 is wound onto the liner 12.

Figure 5:
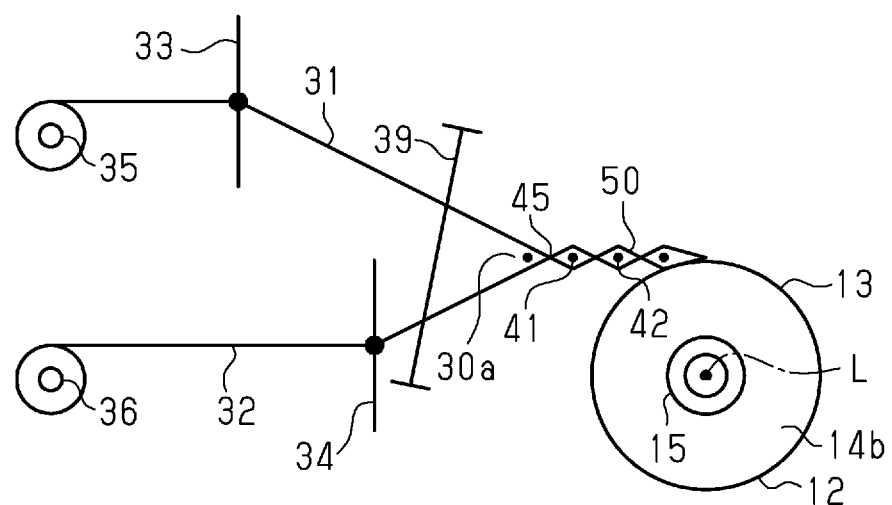
FIG. 5 is a diagram schematically showing a plain weave loom that weaves the reinforced fiber sheet.

As shown in FIG. 5, the fabric 50 is woven using a plain weave loom. The plain weave loom includes, for example, a reinforced fiber heddle frame 33, which creates a shed in the first reinforced fiber 31 of the warp yarn 30, and an auxiliary heddle frame 34, which creates a shed in the first auxiliary yarn 32 of the warp yarn 30. The plain weave loom also includes a warp beam 35, which supplies the first reinforced fiber 31, and a warp beam 36, which supplies the first auxiliary yarn 32. Shedding is performed by the reinforced fiber heddle frame 33 for the first reinforced fiber 31, which is let off from the warp beam 35. Shedding is performed by the auxiliary heddle frame 34 for the first auxiliary yarn 32, which is let off from the warp beam 36. The eyes of the reinforced fiber heddle frame 33 and the auxiliary heddle frame 34 are shown by black circles in FIG. 5.

A reed 39 is disposed between the heddle frames 33, 34 and a cloth fell 45. The reed 39 is a member extending straight in the axial direction Y of the liner 12 (the direction perpendicular to the sheet of FIG. 5). The second reinforced fiber 41 and the second auxiliary yarn 42 of the weft yarn 40 are inserted into the sheds of the first reinforced fiber 31 and the first auxiliary yarn 32 by a weft insertion mechanism (not shown). In the let-off direction of the first reinforced fiber 31 and the first auxiliary yarn 32, the liner 12 is rotationally supported at the position subsequent to the cloth fell 45. The liner 12 is rotated about the central axis L.

To weave the reinforced fiber sheet 19 using the above-described plain weave loom, the ends of the first reinforced fibers 31 pulled out of the warp beam 35 and the ends of the first auxiliary yarns 32 pulled out of the warp beam 36 are fixed to the outer circumferential surface of the liner 12 using, for example, adhesive. This causes the first reinforced fibers 31 and the first auxiliary yarns 32 to extend between the warp beams 35, 36 and the liner 12 with these ends arranged on the body 13 and the dome portions 14a, 14b in the axial direction Y of the liner 12. The first reinforced fibers 31 and the first auxiliary yarns 32 are alternately arranged in the axial direction Y of the liner 12. The adhesive may be made of material that melts when heated by impregnating the reinforced fiber sheet 19 with the matrix resin Ma and curing the matrix resin Ma, and also may be made of material that does not melt.

Figure 6A:
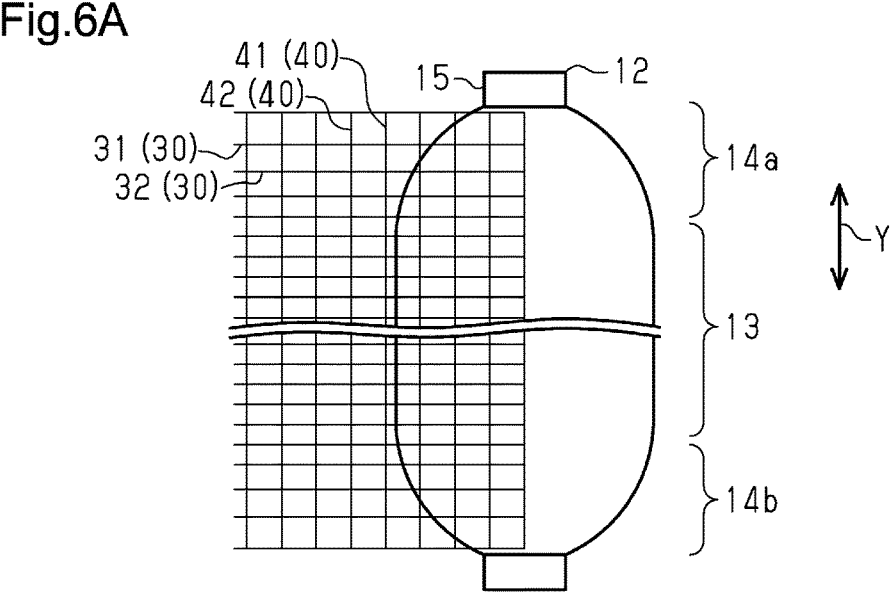
FIG. 6A is a diagram schematically showing a state in which the weft yarns are inserted in the first embodiment.

As shown in FIG. 6A, the first reinforced fibers 31 and the first auxiliary yarns 32 adjacent to each other in the axial direction Y of the liner 12 are arranged such that the arrangement pitches of the first reinforced fibers 31 and the first auxiliary yarns 32 at the arrangement portions for the dome portions 14a, 14b are greater than the arrangement pitches at the arrangement portions for the body 13. Further, the first reinforced fibers 31 and the first auxiliary yarns 32 are arranged such that the arrangement pitches at the arrangement portions for the dome portions 14a, 14b become greater as the distance from the body 13 becomes farther in the axial direction of the dome portions 14a, 14b.

As shown in FIG. 5, when the reinforced fiber sheet 19 is woven, the reinforced fiber heddle frame 33 and the auxiliary heddle frame 34 are alternately moved in the up-down direction such that the liner 12 does not rotate. This moves the reinforced fiber heddle frame 33 and the auxiliary heddle frame 34 in opposite directions. As a result, the first reinforced fiber 31 and the first auxiliary yarn 32 create a warp yarn shed 30a. Every time adjacent ones of the first reinforced fibers 31 and the first auxiliary yarns 32 are alternately opened up and down, the warp yarn shed 30a is created. Every time the warp yarn shed 30a is created, the second reinforced fiber 41 and the second auxiliary yarn 42 are alternately inserted into the warp yarn sheds 30a.

Figure 6B:
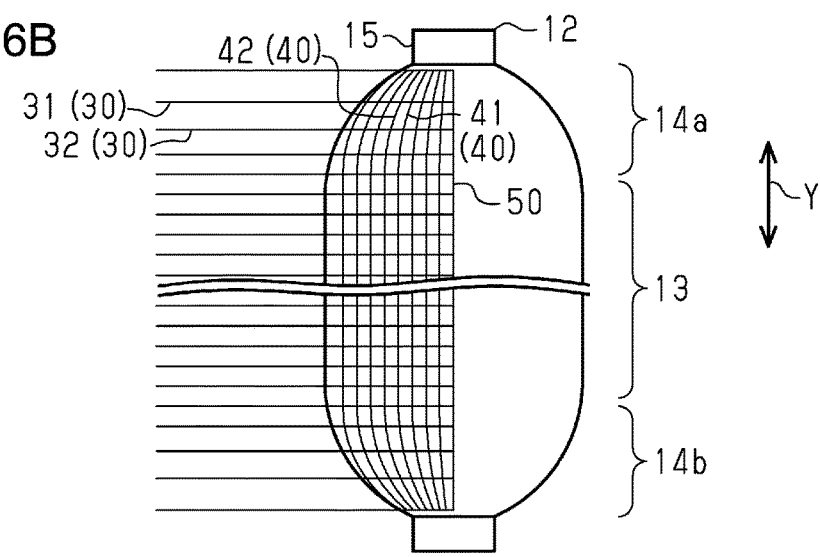
FIG. 6B is a diagram schematically showing a state after a beat-up motion is performed in the first embodiment.

As shown in FIG. 6B, after the warp yarn sheds 30a are created and the second reinforced fibers 41 and the second auxiliary yarns 42 are alternately inserted into the warp yarn sheds 30a a predetermined number of times, a beat-up motion of the reed 39 is performed. The beat-up motion with the reed 39 causes the second reinforced fibers 41 and the second auxiliary yarns 42 to move toward the ends of the first reinforced fibers 31 and the first auxiliary yarns 32 fixed on the outer circumferential surface of the liner 12. Subsequently, the reinforced fiber heddle frame 33 and the auxiliary heddle frame 34 are moved in the opposite directions to change the shedding states so that the next weft insertion is performed. Repeating these motions weaves the reinforced fiber sheet 19 in which the warp yarns 30 (first reinforced fibers 31 and first auxiliary yarns 32) and the weft yarns 40 (second reinforced fibers 41 and second auxiliary yarns 42) are plainly woven. In addition to such weaving of the reinforced fiber sheet 19, the reinforced fiber sheet 19 is integrated with the liner 12.

Figure 6C:
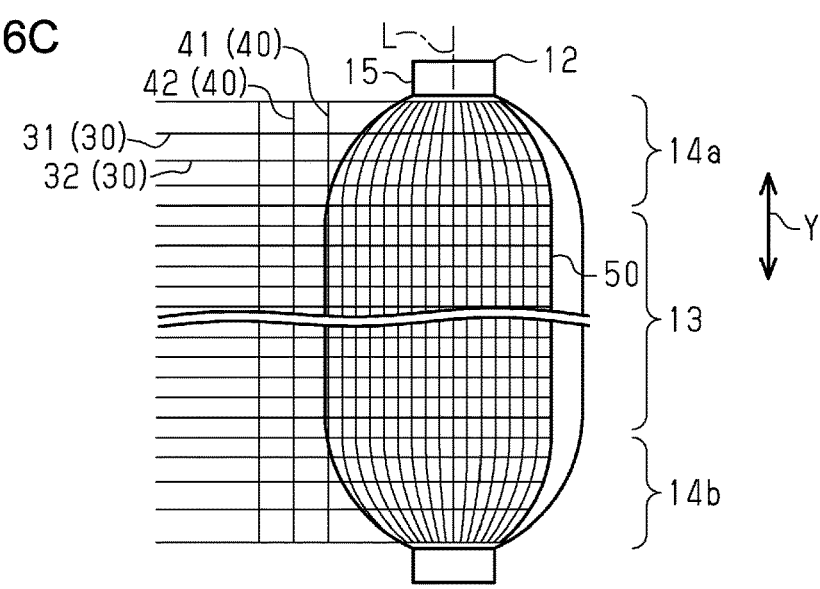
FIG. 6C is a diagram schematically showing a state in which the reinforced fiber sheet is wound onto the liner in the first embodiment.

As shown in FIG. 6C, the woven fabric 50 is wound onto the liner 12 by rotating the liner 12 about the central axis L. While the fabric 50 is wound onto the liner 12, the fabric 50 is then woven in the above-described manner. As a result, the fabric 50 (i.e., reinforced fiber sheet 19) covering the entire body 13 and the entire dome portions 14a, 14b is wound onto the liner 12. In this manner, the fiber structure 21 is manufactured including the reinforced fiber sheet 19 on the outer circumferential surface of the liner 12.

Impregnating the reinforced fiber sheet 19 with the matrix resin Ma and curing the matrix resin Ma forms the fiber-reinforced composite material layer 11, and manufactures the high-pressure tank 10 with the outer side of the liner 12 covered by the fiber-reinforced composite material layer 11. The impregnation and curing of the matrix resin Ma are performed using, for example, resin transfer molding (RTM).

The operation of the high-pressure tank 10 will now be described.

The dome sheet portions 19a, 19b have relatively large arrangement pitches of adjacent ones of the first reinforced fibers 31 and the first auxiliary yarns 32. In the dome sheet portions 19a, 19b, when the reinforced fiber sheet 19 is wound onto the outer circumferential surface of the liner 12, the first reinforced fibers 31 and the first auxiliary yarns 32 easily move in conformance with the shape of the liner 12. Thus, the dome sheet portions 19a, 19b easily conform to the shapes of the dome portions 14a, 14b.

The diameters of the dome portions 14a, 14b become smaller than the diameter of the body 13 as the distance from the body 13 becomes farther in the axial direction. Thus, the shapes of the dome portions 14a, 14b become more curved as the distance from the body 13 becomes farther in the axial direction. In the dome sheet portions 19a, 19b, the arrangement pitches P2, P3 become larger as the distance from the body 13 becomes farther in the axial direction. Thus, the arranged first reinforced fibers 31 and first auxiliary yarns 32 move more easily as the dome portions 14a, 14b become more curved. Accordingly, the dome sheet portions 19a, 19b conform to the shapes of the dome portions 14a, 14b more easily as the parts of the dome portions 14a, 14b covered by the dome sheet portions 19a, 19b become more curved.

The parts of the dome portions 14a, 14b connected to the spinnerets 15 are shaped to protrude outward in the axial direction Y of the liner 12. Thus, the dome portions 14a, 14b are easily deformed by the inner pressure. In the present embodiment, the thicknesses W2, W3 of the dome sheet portions 19a, 19b are smaller than the thickness W1 of the body sheet portion 19m. Thus, the dome sheet portions 19a, 19b resist deforming.

Further, in the high-pressure tank 10, the inner pressure is smaller in the body 13 than in the dome portions 14a, 14b. Thus, even if the dome sheet portions 19a, 19b are not as thick as the body sheet portion 19m, the reinforced fiber sheet 19 is resistant to pressure in a suitable manner. In the present embodiment, setting the thicknesses W2, W3 of the dome sheet portions 19a, 19b to be smaller than the thickness W1 of the body sheet portion 19m allows the reinforced fiber sheet 19 to be resistant to pressure in a suitable manner and prevents the thicknesses W2, W3 of the dome sheet portions 19a, 19b from becoming excessive.

The above-described embodiment achieves the following advantages.

(1-1) The arrangement pitches P2, P3 of the first reinforced fibers 31 and the first auxiliary yarns 32 adjacent to each other in the dome portions 14a, 14b are set to be larger than the arrangement pitch P1 of the first reinforced fibers 31 and the first auxiliary yarns 32 adjacent to each other in the body 13. In other words, the total number N of the warp yarns 30 (first reinforced fibers 31 and first auxiliary yarns 32) that exist per unit length in the axial direction Y of the liner 12 is smaller in the dome portions 14a, 14b than in the body 13. Thus, the dome sheet portions 19a, 19b are arranged in conformance with the shape of the dome portions 14a, 14b in a suitable manner. This prevents the dome sheet portions 19a, 19b from being creased and improves the pressure resistance of the high-pressure tank 10.

(1-2) In the dome sheet portions 19a, 19b, the arrangement pitches P2, P3 become smaller toward the body 13 in the axial direction of the dome portions 14a, 14b. Thus, the dome sheet portions 19a, 19b are arranged in conformance with the shape of the dome portions 14a, 14b in a more suitable manner as compared with when the entire dome portions 14a, 14b have fixed arrangement pitches P2, P3. This further prevents the dome sheet portions 19a, 19b from being creased and further improves the pressure resistance of the high-pressure tank 10.

A second embodiment will now be described with reference to FIGS. 7A to 8C, focusing on the differences from the first embodiment.

As shown in FIGS. 7A to 8C, the second embodiment is different from the first embodiment in that the arrangement pitches P2, P3 of the warp yarns 30 (first reinforced fibers 31 and first auxiliary yarns 32) in the dome portions 14a, 14b are fixed and are the same as the arrangement pitch P1 of the warp yarns 30 in the body 13. Further, as described below, the second embodiment is different from the first embodiment in the arrangement of the weft yarns 40 (second reinforced fibers 41 and second auxiliary yarns 42). Regarding the other structures, the second embodiment is the same as the first embodiment.

Figure 7A:
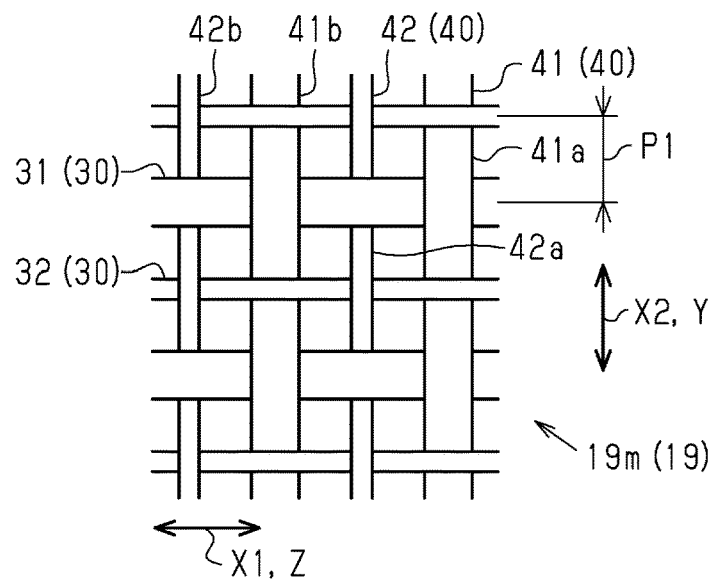
FIG. 7A is a diagram schematically showing the body sheet portion of the reinforced fiber sheet in a second embodiment.
Figure 7B:
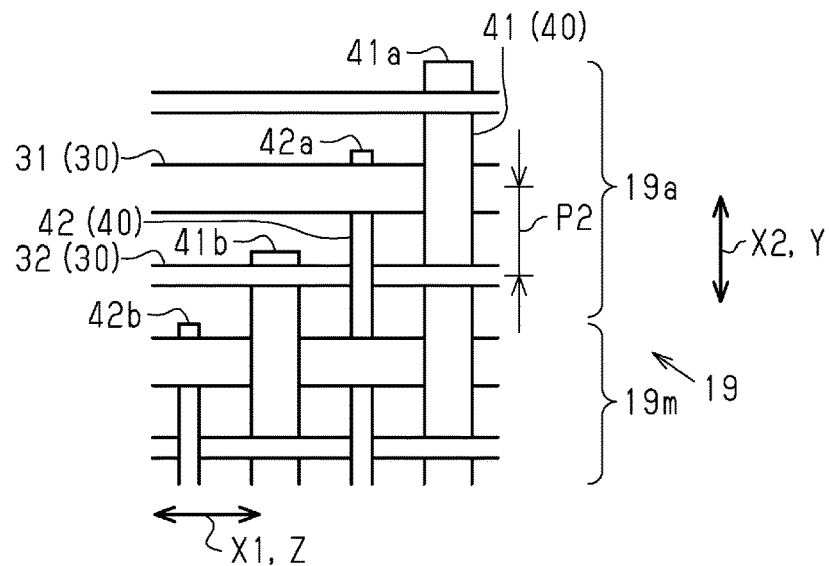
FIG. 7B is a diagram schematically showing one of the dome sheet portions of the reinforced fiber sheet.
Figure 7C:
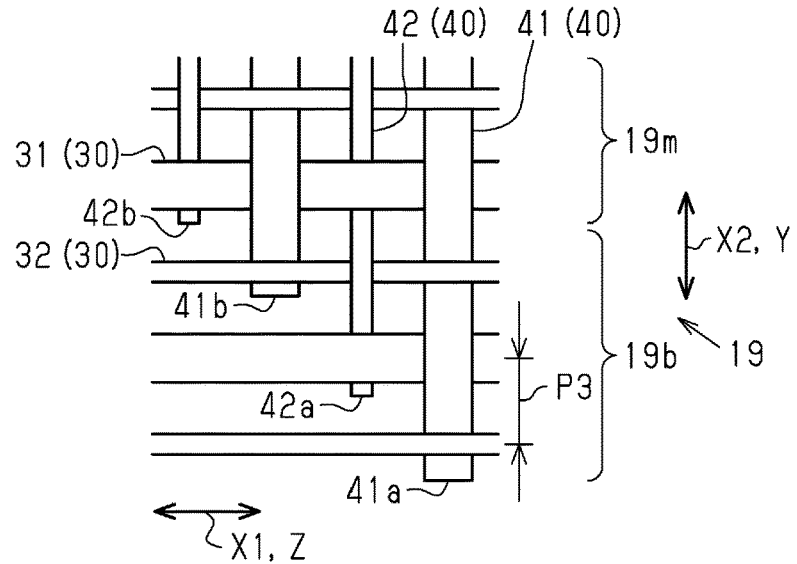
FIG. 7C is a diagram schematically showing the other dome sheet portion of the reinforced fiber sheet.

As shown in FIGS. 7A, 7B, and 7C, the weft yarns 40 (second reinforced fibers 41 and second auxiliary yarns 42) are arranged such that the extending ranges of the weft yarns 40 in the axial direction Y of the liner 12 (up-down direction in FIGS. 7A to 7C) change in the circumferential direction Z of the liner 12 (left-right direction in FIGS. 7A to 7C). More specifically, multiple (four in the present embodiment) weft yarns 40 adjacent to each other are arranged such that the extension ranges in the axial direction Y of the liner 12 sequentially become short in the circumferential direction Z of the liner 12. The four weft yarns 40 arranged such that the extension ranges in the axial direction Y of the liner 12 sequentially become short in the circumferential direction Z of the liner 12 are referred to as, from the one having a longer extension range in the axial direction Y of the liner 12, a second reinforced fiber 41a, a second auxiliary yarn 42a, a second reinforced fiber 41b, and a second auxiliary yarn 42b.

The second reinforced fiber 41a extends in the axial direction Y of the liner 12 over the entire body 13 and the entire dome portions 14a, 14b. The second auxiliary yarn 42a and the second reinforced fiber 41b extend in the axial direction Y of the liner 12 over the entire body 13 and a part of dome portions 14a, 14b. The second auxiliary yarn 42a extends in a longer range over the dome portions 14a, 14b than the second reinforced fiber 41b. The second auxiliary yarn 42b extends in the axial direction Y of the liner 12 over the entire body 13 and does not extend over the dome portions 14a, 14b. The arrangement of the second reinforced fiber 41a, the second auxiliary yarn 42a, the second reinforced fiber 41b, and the second auxiliary yarn 42b is repeated in the circumferential direction Z of the liner 12.

The above-described setting of the extension ranges of the second reinforced fibers 41 and the second auxiliary yarns 42 causes the total number N of the weft yarns 40 (second reinforced fibers 41 and second auxiliary yarns 42) that exist per unit length in the axial direction Y of the liner 12 to be smaller in the dome sheet portions 19a, 19b than in the body sheet portion 19m. Thus, the thickness of the dome sheet portions 19a, 19b is smaller than the thickness of the body sheet portion 19m.

Further, the total number N of the weft yarns 40 (second reinforced fibers 41 and second auxiliary yarns 42) that exist per unit length in the axial direction Y of the liner 12 in the dome portions 14a, 14b becomes smaller as the distance from the body 13 becomes farther. Thus, the thickness of the dome sheet portions 19a, 19b becomes smaller as the distance from the body sheet portion 19m becomes farther.

The second reinforced fiber 41a is a long yarn extending in the axial direction Y of the liner 12 over the entire body 13 and the entire dome portions 14a, 14b. The second auxiliary yarn 42b is a short yarn that extends in the axial direction Y of the liner 12 over the entire body 13 and does not extend over the dome portions 14a, 14b. The second auxiliary yarn 42a and the second reinforced fiber 41b are intermediate yarns extending in the axial direction Y of the liner 12 over the entire body 13 and a part of dome portions 14a, 14b.

From another perspective, the second auxiliary yarn 42a, the second reinforced fiber 41b, and the second auxiliary yarn 42b are short yarns extending in the axial direction Y of the liner 12 over the entire body 13 and extends in a shorter range than the second reinforced fiber 41a (long yarn). The second auxiliary yarn 42a is a first short yarn extending in the axial direction Y of the liner 12 over the entire body 13 and a part of the dome portions 14a, 14b. The second reinforced fiber 41b and the second auxiliary yarn 42b are second short yarns extending in the axial direction Y of the liner 12 in a shorter range than the second auxiliary yarn 42a (first short yarn).

A method for manufacturing the high-pressure tank 10 will now be described, focusing on the differences from the first embodiment.

In the same manner as the first embodiment, the plain weave loom shown in FIG. 5 is used to weave the fabric 50. That is, the ends of the first reinforced fibers 31 pulled out of the warp beam 35 and the ends of the first auxiliary yarns 32 pulled out of the warp beam 36 are fixed to the outer circumferential surface of the liner 12. As shown in FIG. 8A, while the first reinforced fibers 31 and the first auxiliary yarns 32 are alternately arranged in the axial direction Y of the liner 12, the arrangement pitches of the first reinforced fibers 31 and the first auxiliary yarns 32 adjacent to each other are fixed over the entire liner 12 in the axial direction Y of the liner 12 unlike the first embodiment.

Next, in the same manner as the first embodiment, the warp yarn shed 30a is created by the movement of the reinforced fiber heddle frame 33 and the auxiliary heddle frame 34 such that the liner 12 does not rotate. Further, every time the warp yarn shed 30a is created, the second reinforced fiber 41 and the second auxiliary yarn 42 are alternately inserted into the warp yarn sheds 30a.

The second embodiment is different from the first embodiment in that the range of inserting the weft yarn 40 into the warp yarn shed 30a in the axial direction Y of the liner 12 changes every time the weft insertion is performed as shown in FIG. 8A. More specifically, the insertion of the second reinforced fiber 41a is performed in the axial direction Y of the liner 12 in a range extending over the entire body 13 and the entire dome portions 14a, 14b. The range of the insertion of the second reinforced fiber 41a corresponds to a long yarn range. The insertion of the second auxiliary yarn 42a is performed in the axial direction Y of the liner 12 in a range extending over the entire body 13 and a part of the dome portions 14a, 14b. The insertion of the second reinforced fiber 41b is performed in the axial direction Y of the liner 12 in the range extending over the entire body 13 and a part of the dome portions 14a, 14b. The insertion range extending over a part of the dome portions 14a, 14b is shorter in the second reinforced fiber 41b than in the second auxiliary yarn 42a. The insertion of the second auxiliary yarn 42a is performed in the range extending over the entire body 13 and is not performed in the range corresponding to the dome portions 14a, 14b in the axial direction Y of the liner 12. The range of the insertion of the second auxiliary yarn 42a corresponds to a short yarn range. Weft insertion is performed repeatedly in the order of the second reinforced fiber 41a, the second auxiliary yarn 42a, the second reinforced fiber 41b, and the second auxiliary yarn 42b.

The lengths of the second reinforced fibers 41 (second reinforced fibers 41a and second reinforced fibers 41b) and the second auxiliary yarns 42 (second auxiliary yarns 42a and second auxiliary yarns 42b) are set such that weft insertion can be performed over the entire lengths of the warp yarn sheds 30a, which are created by all the first reinforced fibers 31 and the first auxiliary yarns 32 arranged in the axial direction Y of the liner 12. Thus, the opposite ends of the second auxiliary yarns 42a, the second reinforced fibers 41b, and the second auxiliary yarns 42b are not inserted into the warp yarn sheds 30a. The lengths of these non-insertion parts become larger in the order of the second auxiliary yarns 42a, the second reinforced fibers 41b, and the second auxiliary yarns 42b. These non-insertion parts extend along the surface of the reinforced fiber sheet 19.

In the same manner as the first embodiment, as shown in FIG. 8B, after the creation of the warp yarn sheds 30a and the weft insertion are performed a predetermined number of times, the beat-up motion of the reed 39 is performed. Repeating this motion weaves the reinforced fiber sheet 19. In addition to such weaving of the reinforced fiber sheet 19, as shown in FIG. 8C, the rotation of the liner 12 causes the fabric 50 (i.e., reinforced fiber sheet 19) to be wound onto the liner 12. In this manner, the fiber structure 21 is manufactured including the reinforced fiber sheet 19 on the outer circumferential surface of the liner 12. When the weaving of the fabric 50 has progressed to a certain extent or when the weaving of the fabric 50 is completed, the non-insertion parts of the second reinforced fibers 41 and the second auxiliary yarns 42 are removed from the fabric 50 through, for example, cutting.

Subsequently, in the same manner as the first embodiment, impregnating the reinforced fiber sheet 19 with the matrix resin Ma and curing the matrix resin Ma forms the reinforced fiber sheet 19, and manufactures the high-pressure tank 10 with the outer side of the liner 12 covered by the fiber-reinforced composite material layer 11.

In the dome sheet portions 19a, 19b with the relatively small number of arranged weft yarns 40, when the reinforced fiber sheet 19 is wound onto the outer circumferential surface of the liner 12, the weft yarns 40 (second reinforced fibers 41 and second auxiliary yarns 42) easily move in conformance with the shape of the liner 12. Thus, the dome sheet portions 19a, 19b easily conform to the shapes of the dome portions 14a, 14b.

In the dome sheet portions 19a, 19b, the total number N of the weft yarns 40 becomes smaller as the distance from the body 13 becomes farther from the body 13 in the axial direction Y Thus, the arranged weft yarns 40 move more easily as the dome portions 14a, 14b become more curved. Accordingly, the dome sheet portions 19a, 19b conform to the shapes of the dome portions 14a, 14b more easily as the parts of the dome portions 14a, 14b covered by the dome sheet portions 19a, 19b become more curved.

The second embodiment achieves the following advantages.

(2-1) Winding the reinforced fiber sheet 19 onto the outer circumferential surface of the liner 12 causes the yarn main axis direction X1 of the first reinforced fibers 31 and the first auxiliary yarns 32 to coincide with the circumferential direction Z of the liner 12. Thus, the yarn main axis direction X1 of the first reinforced fibers 31 and the first auxiliary yarns 32 arranged on the dome portions 14a, 14b is easily set to a direction in which the pressure resistance of the high-pressure tank 10 is suitable. Further, the second auxiliary yarns 42b are not arranged on the dome sheet portions 19a, 19b. This causes the total number N of the arranged second reinforced fibers 41 and second auxiliary yarns 42 to become smaller in the dome portions 14a, 14b than in the body 13 by an amount corresponding to the number of the second auxiliary yarns 42b. Thus, the dome sheet portions 19a, 19b are arranged in conformance with the shape of the dome portions 14a, 14b in a suitable manner. This prevents the dome sheet portions 19a, 19b from being creased and improves the pressure resistance of the high-pressure tank 10.

(2-2) The weft yarn 40 includes the second auxiliary yarn 42a and the second reinforced fiber 41b, which extend in the axial direction Y of the liner 12 over the entire body 13 and a part of the dome portions 14a, 14b. Further, the second auxiliary yarn 42a and the second reinforced fiber 41b extend in different ranges in the axial direction Y of the liner 12 in the dome portions 14a, 14b. Thus, the dome sheet portions 19a, 19b are arranged in conformance with the shapes of the dome portions 14a, 14b in a more suitable manner as compared with when the weft yarn 40 does not include the second auxiliary yarn 42a and the second reinforced fiber 41b. This further prevents the dome sheet portions 19a, 19b from being creased and further improves the pressure resistance of the high-pressure tank 10.

The third embodiment will now be described.

Figure 9A:
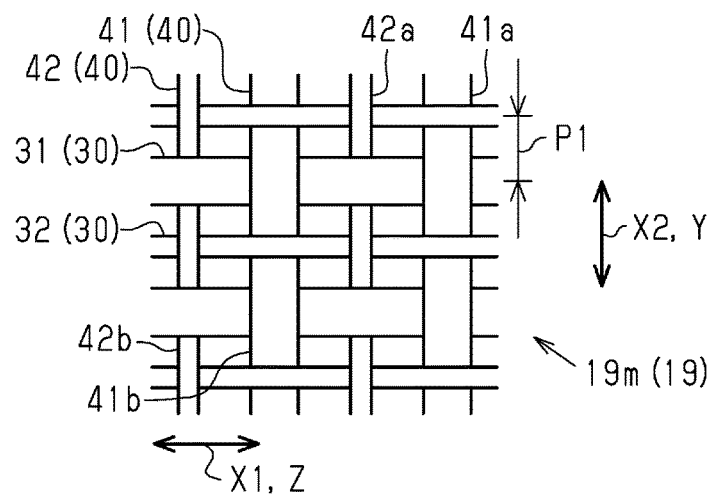
FIG. 9A is a diagram schematically showing the body sheet portion of the reinforced fiber sheet in a third embodiment.
Figure 9B:
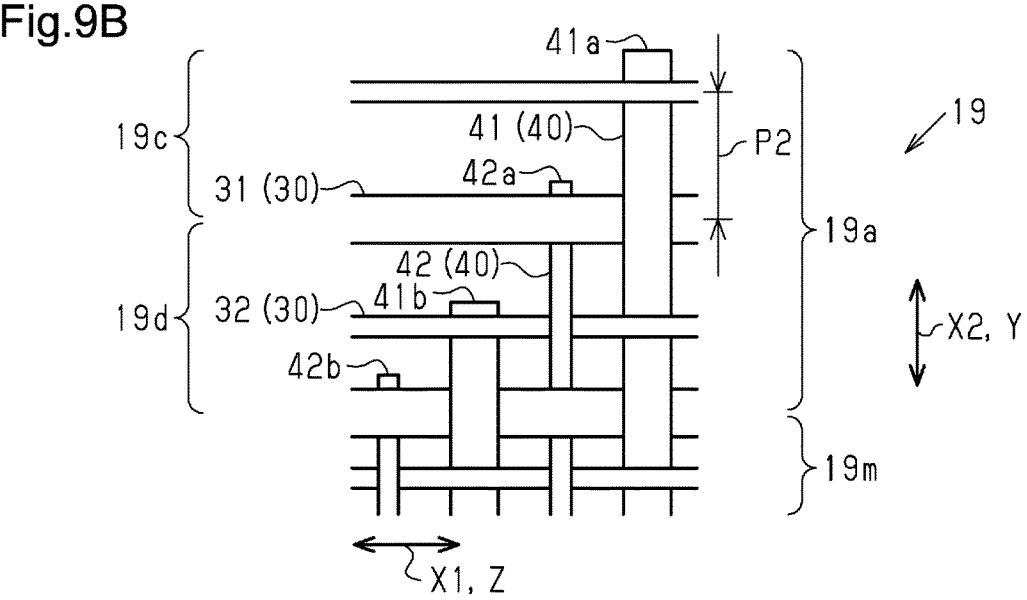
FIG. 9B is a diagram schematically showing one of the dome sheet portions of the reinforced fiber sheet.
Figure 9C:
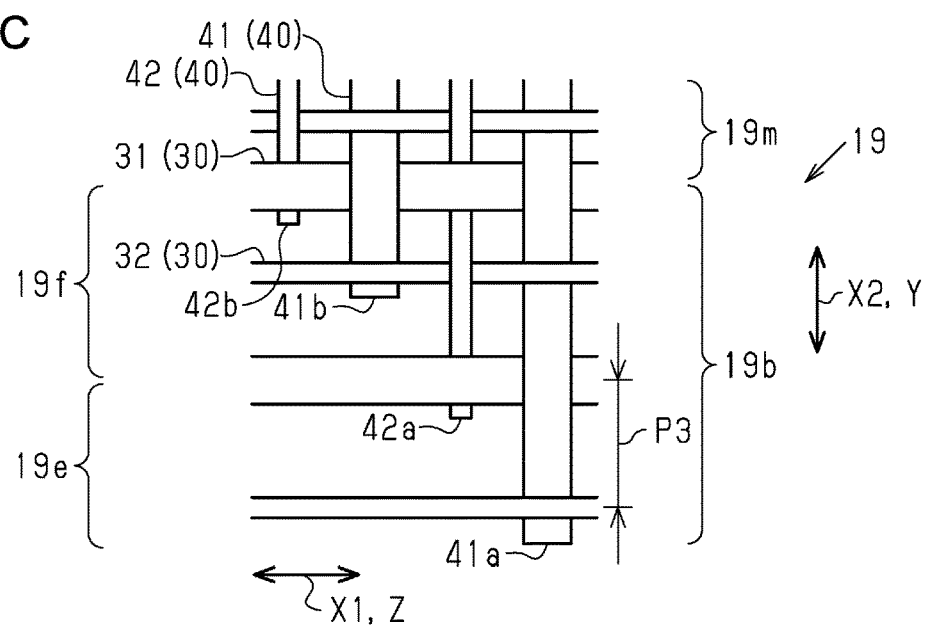
FIG. 9C is a diagram schematically showing the other dome sheet portion of the reinforced fiber sheet.

As shown in FIGS. 9A, 9B, and 9C, the third embodiment is a combination of the first embodiment and the second embodiment. That is, in the third embodiment, the arrangement pitches of the warp yarns 30 (first reinforced fibers 31 and first auxiliary yarns 32) are different between the body 13 and the dome portions 14a, 14b like in the first embodiment, and the extension range of the weft yarns 40 (second reinforced fibers 41 and second auxiliary yarns 42) change in the circumferential direction Z of the liner 12 like in the second embodiment.

Figure 10A:
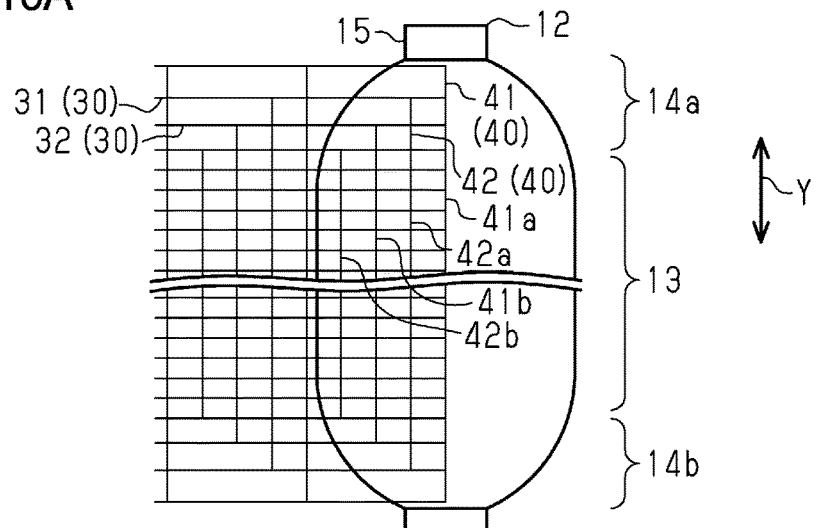
FIG. 10A is a diagram schematically showing a state in which the weft yarns are inserted in the third embodiment.
Figure 10B:
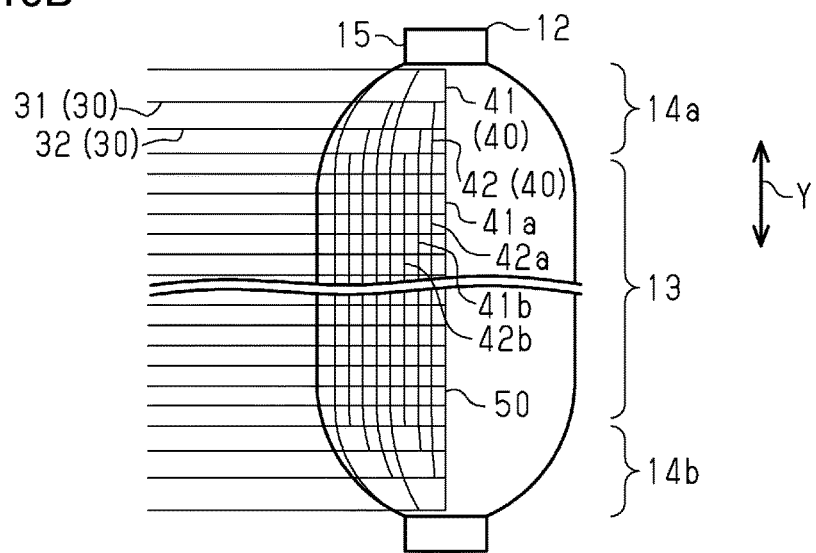
FIG. 10B is a diagram schematically showing a state after the beat-up motion is performed in the third embodiment.
Figure 10C:
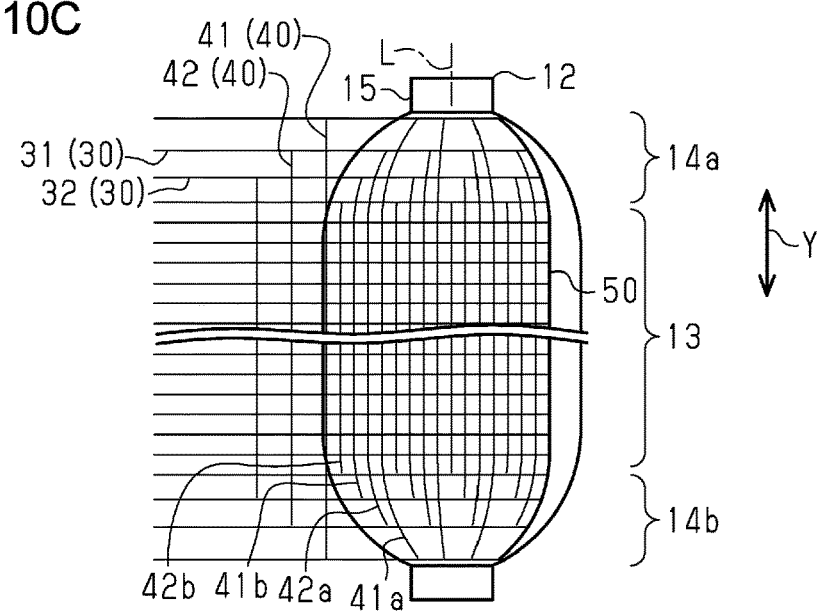
FIG. 10C is a diagram schematically showing a state in which the reinforced fiber sheet is wound onto the liner in the third embodiment.

FIGS. 10A, 10B, and 10C show the method for manufacturing the high-pressure tank 10 in the third embodiment. In the third embodiment, in the same manner as the first embodiment, the warp yarns 30 are arranged such that the arrangement pitch of the warp yarns 30 in the body 13 is greater than the arrangement pitch of the warp yarns 30 in the dome portions 14a, 14b. Further, in the same manner as the second embodiment, the range of inserting the weft yarns 40 in the axial direction Y of the liner 12 is changed every time the weft insertion is performed.

The third embodiment achieves the same advantages as the first and second embodiments.

The above-described embodiments may be modified as follows. The above-described embodiments and the following modifications can be combined as long as the combined modifications remain technically consistent with each other.

In the second and third embodiments, the yarn extending in the axial direction Y of the liner 12 over the entire body 13 and the entire dome portions 14a, 14b may be the second auxiliary yarn 42. In this case, the second reinforced fiber 41 and the second auxiliary yarn 42 are arranged in the circumferential direction Z of the liner 12 such that the extension range in the axial direction Y of the liner 12 becomes smaller in the order of, for example, the second auxiliary yarn 42, the second reinforced fiber 41, the second auxiliary yarn 42, and the second reinforced fiber 41.

In the second and third embodiments, the weft yarns 40 extending in a relatively long range in the axial direction Y of the liner 12 and the weft yarns 40 extending in a relatively short range in the axial direction Y of the liner 12 may alternately line up in the circumferential direction Z of the liner 12.

In the second and third embodiments, the second reinforced fibers 41 and the second auxiliary yarns 42 may be arranged such that two or more weft yarns 40 with the same extension range in the axial direction Y of the liner 12 successively line up in the circumferential direction Z of the liner 12.

In the second and third embodiments, the range of the weft yarn 40 extending in the axial direction Y of the liner 12 may change in five steps or more, or may change in three steps or less. In this case, in the axial direction Y of the liner 12, the weft yarn 40 includes at least the long yarn extending over the entire body 13 and the entire dome portions 14a, 14b and the short yarn that extends over the entire body 13 and does not extend over a part of the dome portions 14a, 14b or does not extend over the entire dome portions 14a, 14b.

In the first and third embodiments, the arrangement pitch sizes of the warp yarns 30 adjacent to each other in the dome portions 14a, 14b may be gradually changed in the axial direction Y of the liner 12. In this modification, for example, at least three warp yarns 30 are each arranged with the same arrangement pitch in the dome portions 14a, 14b such that the arrangement pitch becomes smaller toward the body 13 in the axial direction Y of the liner 12.

In the first and third embodiments, the arrangement pitch sizes of the warp yarns 30 adjacent to each other in the dome portions 14a, 14b do not have to be sequentially arranged in the axial direction Y of the liner 12. For example, the arrangement pitches of the warp yarns 30 adjacent to each other in the dome portions 14a, 14b may be arranged such that a relatively large arrangement pitch and a relatively small arrangement pitch alternately line up in the axial direction Y of the liner 12.

In the first and third embodiments, the dome portion 14a and the dome portion 14a may be different in a combination of arrangement pitch sizes of the warp yarns 30 and in the manner of changing the arrangement pitch sizes.

In the first and third embodiments, the arrangement pitches of the warp yarns 30 adjacent to each other in the dome portions 14a, 14b may be fixed over the entire dome portions 14a, 14b. Alternatively, the dome portions 14a, 14b may have the same or different arrangement pitch sizes of the warp yarns 30.

The reinforced fiber sheet 19 may be made of a multilayer fabric in which fiber layers including the first reinforced fibers 31 and the first auxiliary yarns 32 and fiber layers including the second reinforced fibers 41 and the second auxiliary yarns 42 are laminated and these fiber layers are bound in the laminating direction.

The fabric 50 may be woven using fiber bases that have been impregnated with resin in advance.

The liner 12 may be shaped such that a dome portion is continuous with one end of the body 13 in the axial direction Y and a flat end wall is continuous with the other end of the body 13 in the axial direction Y In this case, the spinneret 15 exists at only the end where the dome portion exists.

The entire liner 12 may be made of aluminum alloy instead of aluminum. The spinneret 15 may be made of metal other than stainless steel.

The high-pressure tank 10 does not need to be used as a hydrogen tank for an electric automobile equipped with a fuel cell. Instead, for example, the high-pressure tank 10 may be used as a hydrogen tank of a hydrogen engine or may be applied to a heat pump or the like. Alternatively, the high-pressure tank 10 may be used as a hydrogen tank of a fuel cell of utility power.

The high-pressure tank 10 is not limited to a high-pressure tank that stores hydrogen. Instead, the high-pressure tank 10 may applied to, for example, a pressure vessel that stores gas other than hydrogen such as nitrogen or compressed natural gas.

The invention claimed is:

1. A pressure vessel, comprising:
a liner including a cylindrical body and curved shaped dome portions continuous at each end of the body in an axial direction; and
a reinforced fiber sheet wound onto an outer circumferential surface of the liner in a circumferential direction of the liner and covering an outer side of the liner, the reinforced fiber sheet being made of fabric, wherein
the reinforced fiber sheet includes first yarns arranged on the body and the curved shaped dome portions such that yarn main axes of the first yarns extend in the circumferential direction of the liner and second yarns arranged on the body and the curved shaped dome portions such that yarn main axes of the second yarns extend in the axial direction of the liner, wherein an arrangement pitch of adjacent ones of the first yarns in each of the curved shaped dome portions is larger than an arrangement pitch of adjacent ones of the first yarns in the body, and a total number of the first yarns or the second yarns that exist per unit length in the axial direction of the liner is smaller in the curved shaped dome portions than in the body.

2. The pressure vessel according to claim 1, wherein
each curved shaped dome portion includes a first dome portion and a second dome portion, wherein the first dome portion is located further away from the body in the axial direction of the liner than the second dome portion and
an arrangement pitch of adjacent ones of the first yarns in the second dome portion is smaller than an arrangement pitch of adjacent ones of the first yarns in the first dome portion.

3. The pressure vessel according to claim 1, wherein the second yarns include long yarns extending in the axial direction of the liner over the entire body and the entire curved shaped dome portions and short yarns extending in the axial direction of the liner over the entire body and in a shorter range than the long yarns.

4. The pressure vessel according to claim 3, wherein the short yarns include first short yarns extending in the axial direction of the liner over the entire body and a part of the curved shaped dome portions and second short yarns extending in the axial direction of the liner in a shorter range than the first short yarns.

5. The pressure vessel according to claim 4, wherein the second yarns are arranged in an order of the long yarns, the first short yarns, and the second short yarns in the circumferential direction of the liner.

6. The pressure vessel according to claim 1, wherein the second yarns include long yarns extending in the axial direction of the liner over the entire body and the entire curved shaped dome portions and short yarns that extend in the axial direction of the liner over the entire body and do not extend over the curved shaped dome portions.

7. The pressure vessel according to claim 6, wherein the second yarns further include intermediate yarns extending in the axial direction of the liner over the entire body and a part of the curved shaped dome portions.

8. The pressure vessel according to claim 7, wherein the second yarns are arranged in an order of the long yarns, the intermediate yarns, and the short yarns in the circumferential direction of the liner.

9. A method for manufacturing a pressure vessel, the method comprising:
preparing a liner including a cylindrical body and curved shaped dome portions continuous at each end of the body in an axial direction; and
covering an outer side of the liner with a reinforced fiber sheet made of fabric, the covering the liner with the reinforced fiber sheet including:
arranging a plurality of first yarns adjacent to one another in an axial direction of the liner over the body and the curved shaped dome portions, the first yarns extending from the liner in a direction orthogonal to the axial direction of the liner;
weaving the reinforced fiber sheet by repeatedly inserting second yarns extending in the axial direction of the liner into sheds created between adjacent ones of the first yarns in the axial direction of the liner and pushing the second yarns toward the liner through a beat-up motion; and
winding the woven reinforced fiber sheet onto the liner by rotating the liner about a central axis of the liner concurrently with the weaving of the reinforced fiber sheet,
wherein the arrangement of the first yarns in the axial direction of the liner or the insertion of the second yarns into the sheds are performed such that a total number of the first yarns or the second yarns that exist per unit length in the axial direction of the liner becomes smaller in the curved shaped dome portions than in the body, and
wherein the first yarns are arranged in the axial direction of the liner such that an arrangement pitch of the first yarns in an arrangement portion for the curved shaped dome portions becomes larger than an arrangement pitch of the first yarns in an arrangement portion for the body.

10. The method according to claim 9, wherein the insertion of the second yarns into the sheds is performed in a long yarn range extending over the entire body and the entire curved shaped dome portions in the axial direction of the liner and in a short yarn range that extends over the entire body and does not extend over the curved shaped dome portions in the axial direction of the liner.

\* \* \* \* \*